Figure 1:
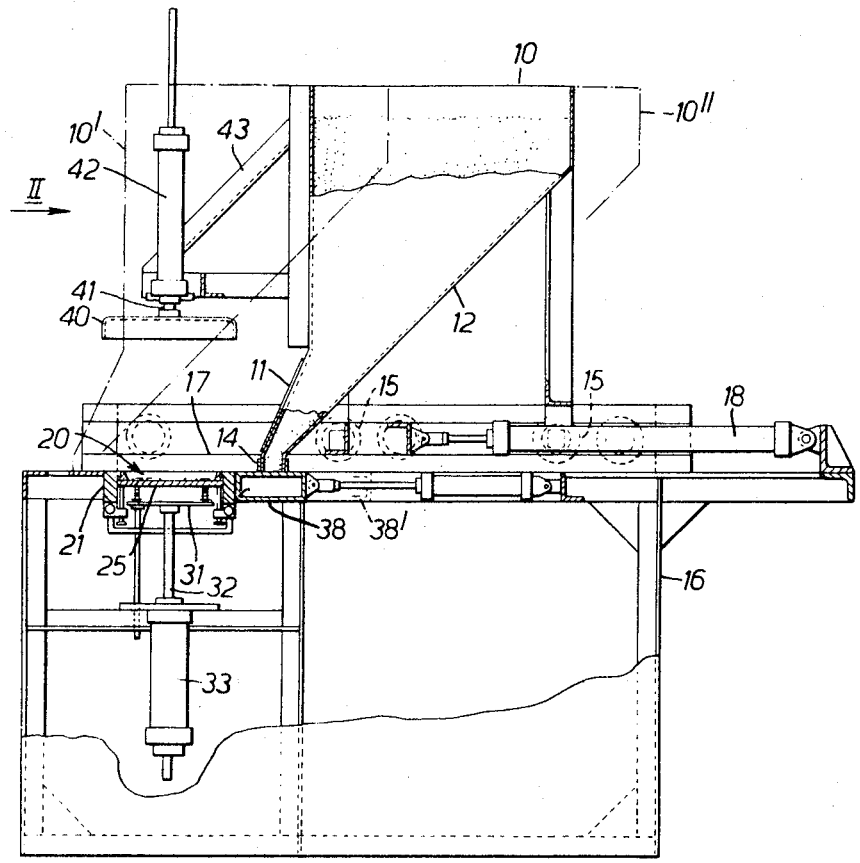

United States Patent
Mawson et al.

[15] 3,664,406
[45] May 23, 1972

[54] MOLD MAKING MACHINES

[72] Inventors: Desmond Leonard Mawson, Sherwood, Aston near Sheffield; Bernard Malone, Mytchett, Camberley, both of England

[73] Assignee: Hooker Chemical Corporation, Niagara Falls, N.Y.

[22] Filed: Dec. 1, 1969

[21] Appl. No.: 881,276

[52] U.S. Cl. .................. 164/161, 164/40, 164/165, 164/183, 164/192
[51] Int. Cl. ................... B22c 13/02, B22c 5/12
[58] Field of Search ............ 164/17, 37, 40, 161, 165, 169, 164/180, 183, 186, 192, 193, 207, 209

[56] References Cited

UNITED STATES PATENTS

| | | | |
|---|---|---|---|
| 3,516,477 | 6/1970 | Harris et al. | 164/165 X |
| 2,887,741 | 5/1959 | Sabel | 164/192 X |
| 3,096,547 | 7/1963 | Hunter et al. | 164/186 |

FOREIGN PATENTS OR APPLICATIONS

| | | | |
|---|---|---|---|
| 571,129 | 2/1959 | Canada | 164/193 |

*Primary Examiner*—J. Spencer Overholser
*Assistant Examiner*—John E. Roethel
*Attorney*—Peter F. Casella, Donald C. Studley, Richard P. Mueller and James F. Mudd

[57] ABSTRACT

An apparatus is provided for use in producing shell molds particularly suited to stack molding operations. In one embodiment, there is provided an electrically heated pressure plate which is arranged above the pattern frame so that it can be lowered by means of a pneumatic cylinder to compact and cure granular material treated with a bonding agent, such as resin coated sand, in the core box. In another embodiment in which the apparatus is used to make hollow shell molds, the heater plate above the core box is replaced by an electrically heated or gas heated hood. In this arrangement, the pattern frame is hinged so that it can be inverted to remove surplus sand from the pattern frame, after which the heated hood is lowered by means of a pneumatic cylinder to a position over the pattern frame to cure the back of the shell mold. The resulting cured sand molds are ready for immediate use in stack molding without further handling.

11 Claims, 6 Drawing Figures

MOLD MAKING MACHINES

This invention relates to machines for making shell moulds and/or stack moulds.

In such machines the moulds are formed by depositing a granular moulding material into a moulding box and then heat-bonding the material in the box. The moulding material is usually known as sand, which term will hereinafter be used for convenience, and normally comprises sand coated with thermosetting synthetic resin, although it may comprise some other granular material coated with a synthetic resin or other thermosetting bonding material.

According to the present invention a machine for making shell moulds and/or stack moulds comprises an open-topped heated moulding box whose bottom is constituted by a pattern plate, and a sand dispenser having a downwardly-facing dispensing nozzle located over the moulding box and at a level close to that of the top of the box, and means for traversing the dispensing nozzle horizontally across the top of the moulding box to dispense sand into the box, the nozzle having an elongated horizontal edge portion which serves to level the sand in the box and to displace surplus sand.

In one arrangement of the invention, the dispensing nozzle is constructed and arranged to traverse the moulding box with a horizontally-reciprocating motion, and to fill the moulding box with sand completely during a single forward traversing stroke across the top of the box, and its said edge portion is arranged to level the sand therein and displace surplus sand during the next succeeding return stroke of the nozzle.

For the purpose of making stack moulds, a heated pressure plate is movably mounted above the moulding box and is movable down onto the top of the moulding box after the return stroke of the nozzle, to compact the sand in the mould box and partially cure its upper surface. In this way a hard smooth back surface is formed on the solid stack mould, which will mate accurately in good sealing relationship with the opposed surface of an adjacent stack mould in a stack employed for stack moulding.

In previous arrangements for forming stack moulds, the moulds have been formed by a "blow" moulding or a "dump" moulding system. In the former system the sand is blown into a metal mould at sufficient velocity and air pressure to fill the entire mould cavity with sand, the metal mould being heated to cure the sand after which the metal mould is opened and the single sand stack mould produced therein is removed. The sand is blown into the metal mould through a hole, or any number of blow entries, in the metal mould, and a series of protuberances are thus formed along the flat face or faces of the sand stack mould which must be cleaned off before the mould is used for stack moulding, since if these protuberances are not removed adjacent stack moulds will not seal properly in a stack and molten metal will escape from the joints at each level when casting. The sand may alternatively be blown in at the side of the metal mould but this is unsatisfactory since it leads to failure to blow very small cores within the mould such as is often required, for example in magnet moulds.

The capital cost of the "blow" equipment and the maintenance costs are high and also the "blowing" of the sand leads to sand-blasting and consequent wear and tear of the mould.

In the dump system for making single stack moulds sand is dispensed into a pattern frame from a dumping box having a number of holes in its base, which is arranged above the pattern frame. The holes are opened by a suitable sliding gate member provided with holes formed to correspond with the holes in the bottom of the box, so as to fill the mould. When the pattern frame has been filled the surplus sand is removed from the top of the pattern frame by means of a strickle-bar or scraper-bar which the operator runs along the top edges of the pattern frame to obtain a flat top face to the sand mould. In spite of this strickling operation the top face of the sand mould is still in the form of a series of ripples so that when the moulds are formed into a stack they will not make a satisfactory seal with one another, but will allow molten metal to escape at the joints with ensuing loss of metal and danger to the operator; and thus further grinding and other operations have to be performed on the surfaces of the cured stack moulds to remove the ripples.

With a machine according to the present invention the sand on the top of the pattern frame is levelled automatically by the nozzle, and if pressure is also applied to this levelled flat face by a pressure plate to compact it, this produces a dense surface layer which will resist penetration of metal in the casting process and also avoid "burst out" when pouring the complete stack mould. The direct contact of the heated pressure plate on top of the sand thus provides rapid curing and a good sealing face.

In an alternative arrangement according to the present invention the machine may be used for making hollow-back shell moulds. In this arrangement the moulding box is pivotally mounted for inversion, for the purpose of tipping out unbonded surplus sand from its interior. In this case, instead of the heated pressure plate referred to, a heated hood is preferably provided which is movable to a position enclosing the moulding box for the purpose of curing the back of the shell mould remaining therein.

The invention also comprises a method of forming stack moulds or shell moulds from sand, in which a horizontally-movable downwardly-facing sand dispensing nozzle is traversed across the open top of a moulding box in close proximity thereto to fill the box with sand, and in which the sand in the box is levelled and excess sand is displaced by a horizontal edge portion of the nozzle during its traversing movement.

Preferably the nozzle is traversed with a horizontal reciprocating motion across the moulding box, a forward stroke of the nozzle completely filling the box with sand and the next succeeding reverse stroke of the nozzle levelling the sand and displacing surplus sand.

According to another aspect of the present invention, a moulding box for use in the moulding of shell moulds or stack moulds, for example in a machine as referred to above, comprises a pattern frame having internal lining strips detachably secured to its inner side walls to constitute the sides of the moulding space in the box, and a movable pattern plate constituting the bottom of the moulding box and movable into engagement with the lower edges of the strips, whereby the depth of the moulding space in the box is determined by the width of the detachable lining strips.

Conveniently the lining strips are arranged to be locked in position in the pattern frame by the pattern plate when the latter is held in its operative position abutting the strips. For example, the pattern frame may be formed with inwardly-directed undercut flanges or grooves, and the lining strips are formed with correspondingly dovetailed rib or flange portions which cooperate therewith.

Figure 2:
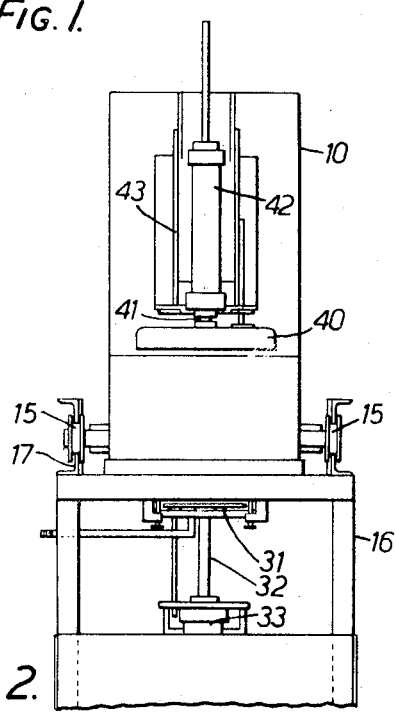
Figure 3:
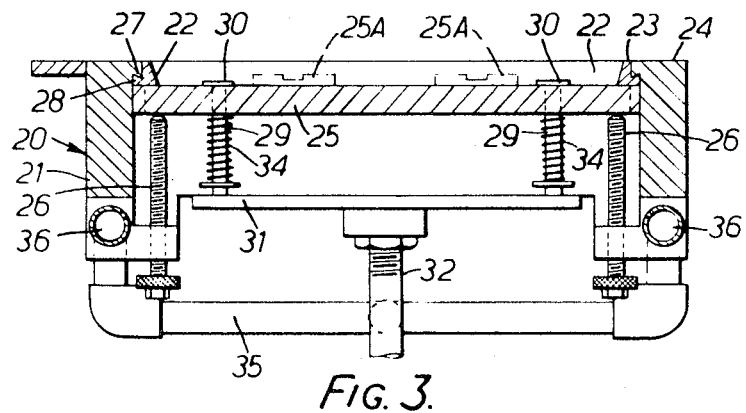
Figure 4:
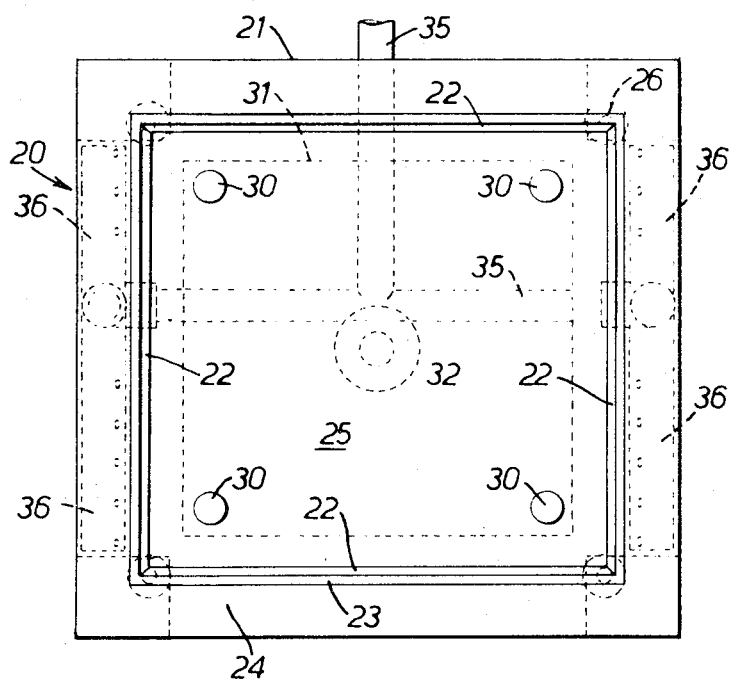
Figure 5:
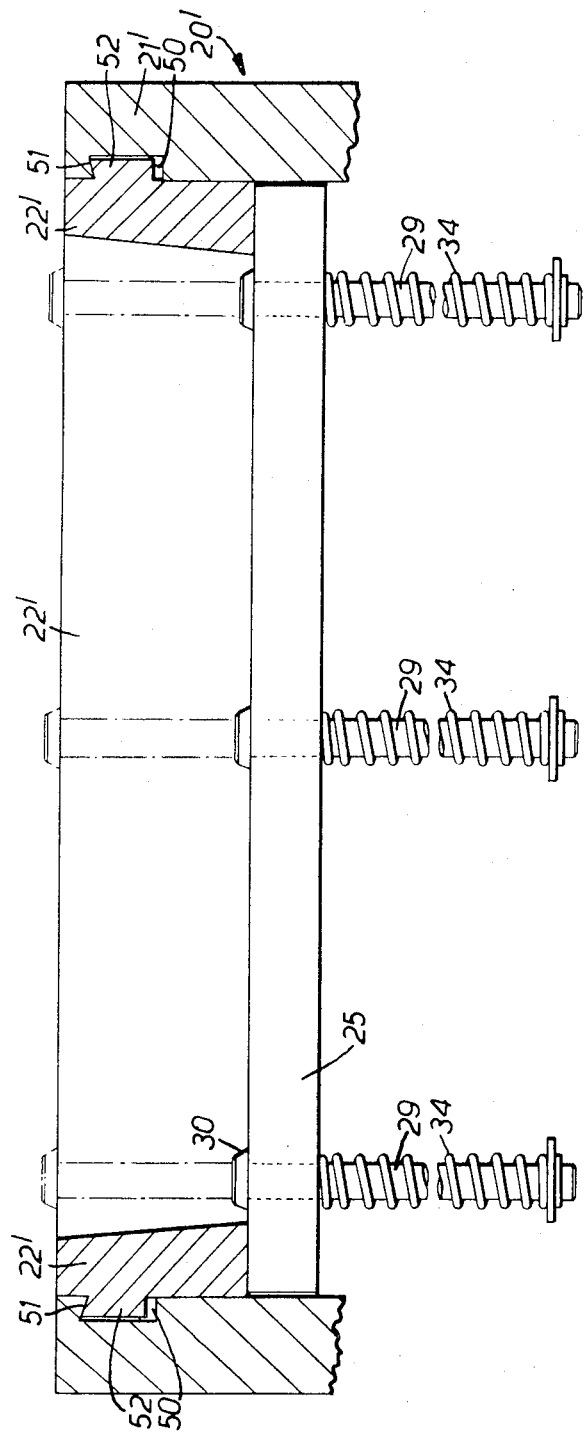

The invention may be put into practice in various ways, but one specific embodiment, together with certain modifications thereof, will now be described by way of example with reference to the accompanying drawings, in which FIG. 1 is a side elevation of a mould making machine, FIG. 2 is a front elevation of the machine of FIG. 1, seen in the direction of the arrow II in FIG. 1, FIG. 3 is a sectional elevation on a larger scale of the heated moulding box of the furnace of FIGS. 1 and 2, FIG. 4 is a plan of the moulding box shown in FIG. 3, FIG. 5 is an enlarged detailed sectional view of the upper part of a modified form of the moulding box for use in the machine of FIGS. 1 to 4, and FIG. 6, is a partial view of the side elevation of the mould making machine of FIG. 1, when modified to replace a heated pressure plate with a heated hood, and to show inversion of the moulding box.

FIGS. 1 to 4 show a machine for making stack moulds from sand, the machine comprising a sand bin 10 for containing a supply of sand or other granular material treated with a suitable bonding agent, for example a synthetic resin, which constitutes the mould material and which will for convenience be termed sand hereafter. The sand bin 10 is in the form of a hopper, the lower parts of two opposite sides 11, 12 of which converge towards one another and are joined at the base of the sand bin 10 to an elongated dispensing mouth 14 through which the sand can be dispensed. The sand bin 10 is mounted on rollers 15 on a main frame 16 and is arranged to be movable horizontally along a track 17 on the upper part of the main frame by a double-acting pneumatic cylinder 18. An open-topped moulding box generally indicated at 20 in FIG. 1, and shown in detail in FIGS. 2 and 3, is mounted in a fixed position at one side of the top of the main frame 16 below the track 17, the upper edge of the moulding box being positioned at a level slightly below that of the bottom of the dispensing mouth 14. The sand bin 10 is shown in FIG. 1 in a partially retracted position in which it is offset from the moulding box 20, but is movable by means of the cylinder 18 towards the left in FIG. 1 so that its dispensing mouth 14 traverses over the whole of the top of the moulding box to dispense sand in the latter, until it reaches a fully-advanced position shown at 10' in FIG. 1, and is then withdrawn towards the right in FIG. 1 traversing over the moulding box 20 so that the longitudinal edge of the mouth 14 will level the upper surface of the sand in the box 20 and remove excess sand, and finally being withdrawn to a fully-retracted position shown in chain lines at 10'' in FIG. 1.

The moulding box 20 as shown in FIGS. 3 and 4 comprises a rectangular pattern frame 21 which is provided with lining strips 22 which are separable from the pattern frame 21, the upper surfaces 23 of the lining strips 22 lying flush with the upper surface 24 of the pattern frame 21. The moulding box also includes a pattern plate 25 which constitutes the bottom of the moulding box and is adjustably supported in the pattern frame 21 on four screw-threaded bolts 26, the arrangement being such that the pattern plate 25 is held by the bolts 26 in a position abutting against the lower edge faces of the lining strips 22. Patterns 25A are formed or detachably mounted on the pattern plate 25. The four inwardly-facing walls of the pattern frame 21 are provided with undercut upper flanges 27, and the lining strips are provided with correspondingly shaped outwardly-projecting ribs 28 which interengage with the flanges 27 to prevent the withdrawal of the strips 22 when the pattern plate 25 is in position beneath them, the upper surfaces 23 of the lining strips then lying flush with the top surface 24 of the pattern frame 21.

The moulding box 20 is provided with ejector pins 29 arranged to extend through apertures in the pattern plate 25 and formed at their upper ends with heads 30. The ejector pins 29 are secured to an ejector plate 31 which is mounted on the plunger rod 32 of a pneumatic cylinder 33 positioned below the pattern plate 25, actuation of the cylinder 33 serving to lift the ejector plate 31 and the pins 32 relatively to the pattern plate for the purpose of ejecting a formed mould from the moulding box 20. Compression springs 34 act between the ejector plate 31 and the pattern plate 25 to tend to hold the pins 29 in their lowermost positions.

The mould box 20 is heated by gas supplied through ducts 35 to burners 36 arranged beneath opposite sides of the pattern frame 21.

Arranged below the mouth 14 of the sand bin 10 when in its retracted position is a water-cooled closure box 38 which is also mounted for horizontal movement with its upper surface in the same horizontal plane as that of the top of the moulding box 20, and is driven by means of a pneumatic cylinder 39. The closure box 38 is arranged to move with the sand bin 10 from its retracted position shown in chain lines at 38' to its advanced position shown in full lines in which it abuts against the side of the pattern frame 21, as shown in FIG. 1. The box 38 acts as a cooled closure member for the mouth 14 of the sand bin 10 when the latter is retracted clear of the moulding box 20, to prevent the escape of sand and to retain the sand lying on it in the mouth 14 in a fluid, unbonded state.

An electrically-heated pressure plate 40 having a horizontal lower surface is carried by the plunger 41 of a pneumatic cylinder 42 above the moulding box 20, the cylinder 42 being mounted on a bracket 43 secured to the side of the sand bin 10. When the sand bin is in its partially-retracted position shown in firm lines in FIG. 1, the pressure plate 40 is situated vertically above the open top of the moulding box 20 and can be lowered onto the latter by means of the cylinder 42 to compact and cure sand in the moulding box.

The operation of the machine in the manufacture of stack moulds will now be described. Assume that the sand bin 10 and water-cooled closure box 38 are initially in their fully-retracted positions 10'' and 38', and that one or more patterns 25A are positioned on the upper surface of the pattern plate 25 in the empty heated moulding box 20. The operator presses a push button by which compressed air is first admitted simultaneously to the pneumatic cylinder 18 operating the sand bin 10 and to the pneumatic cylinder 39 operating the water-cooled closure box 38, so as to move the sand bin 10 and box 38 simultaneously towards the left in FIG. 1. When the water-cooled box 38 reaches the side of the pattern frame 21 the air supplied to its operating cylinder 39 is cut off automatically by a trip valve, but the sand bin 10 continues to be moved forwards by the cylinder 18 over the top of the moulding box 20; when the dispensing mouth 14 of the sand bin reaches and passes over the open upper part of the heated moulding box 20 it dispenses sand into the interior of the latter, the arrangement being such that the moulding box is filled with sand during one leftward traversing stroke of the mouth 14 of the sand bin 10. When the dispensing mouth 14 reaches the far side of the pattern frame 21 the flow of sand through it is cut off as it once more engages the flat horizontal surface 24 of the top of the pattern frame, and when the sand bin reaches its fully-advanced position 10' it strikes a signal valve by which the supply of air to the pneumatic cylinder 18 is reversed. The pneumatic cylinder 18 is thereby actuated in reverse to return the sand bin to the right in FIG. 1 towards its withdrawn position 10'', and as the mouth 14 traverses back across the top of the pattern frame 21 the longitudinal edges of the mouth 14 will level the sand in the moulding box 20 and will wipe off excess sand. When the mouth 14 of the sand bin again reaches the water-cooled closure box 38, it engages a protrusion (not shown) on the top face of the box 38, and draws the box 38 back to its retracted position 38'.

When the sand bin 10 reaches its fully retracted position 10'' it strikes another signal valve by which the pneumatic cylinder 42 is actuated to lower the heated pressure plate 40 onto the top of the moulding box 20 to compact the sand therein; the plate 40 dwells for a predetermined period in that position to complete the curing of the moulded sand in the box 20. This period is preset by a timer, and at the end of the period the cylinder 42 is actuated automatically in reverse to withdraw the electrically-heated pressure plate 40, which strikes another signal valve by which the cylinder 33 is actuated to raise the ejector plate 31 and cause the ejector pins 29 to lift the cured stack mould clear of the pattern plate 25 so that is can be removed by the operator from the moulding box 20.

FIG. 5 shows details of a modified construction of moulding box 20'. In this case the pattern frame 21' is formed with longitudinal grooves 50 in its inwardly-facing surfaces, each groove 50 having its upper side wall 51 undercut at an inclination of 15° as shown. Each lining strip 22' has a protruding longitudinal rib 52 of half-dovetail form on its rear surface, matched to the undercut wall 51. Each rib 52 is narrower than the associated groove 50 so that the rib can be inserted into and withdrawn from the mouth of the groove when the pattern plate 25 has been lowered, but when the pattern plate is fully raised by its bolts 26 it lifts the lining strips 22' into their positions shown in FIG. 5 in which the interengagement of the half-dovetailed ribs 52 with the undercut walls 51 of the groove 50 locks the lining strips against removal.

It will be clear that the moulding box 20 of FIGS. 3 and 4, and also the modified box 20', are both of adjustable depth. To change the effective moulding depth the pattern plate 25 is lowered and the four lining strips 22 or 22' are removed and replaced by four other strips 22 or 22' of greater or lesser depth, as required. The pattern plate 25 is then raised again by means of its bolts 26 to lock the replacement lining strips in position. In a typical example the moulding box provides a square internal moulding space 10 inches by 10 inches in plan, and the moulding depth is adjustable between one-half inch and 2 inches by selection of lining strips of appropriate width.

Figure 6:
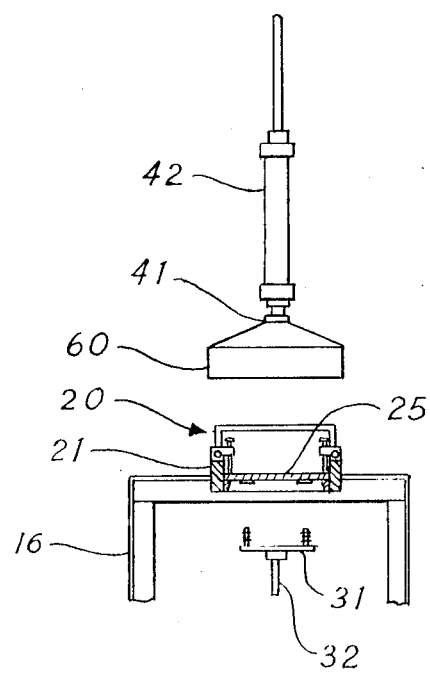

The machine of FIGS. 1 to 4 can readily be modified to make hollow-backed shell moulds. For this purpose the pressure plate 40 above the moulding box 20 is replaced by an electrically-heated or gas-heated hood 60, and the moulding box is pivotally mounted in the main frame 16 so that it can be inverted. In this arrangement, which is illustrated in FIG. 6, the operation of traversing the sand bin across the upwardly-facing moulding box takes place in the same manner as described above to fill the moulding box and level the sand in it. After the sand bin has been retracted the moulding box is heated by its gas burners 36 for a short time sufficient to partly cure the resin of the sand adjacent to the moulding surfaces, and then the moulding box is inverted in the frame 16, in a manner known in the art as shown in U.S. Pat. No. 2,887,741, to the position shown in FIG. 6, either manually or automatically as by means of a pneumatic cylinder, so that unbonded surplus sand will fall out of the moulding box leaving the partly-cured shell mould in position therein. The moulding box is then returned to its normal upwardly-facing position. The heated hood is lowered by means of pneumatic cylinder 42 to a position enclosing the moulding box to cure the back of the shell mould therein.

After a predetermined curing time the hood is removed upwardly to its retracted position, and the ejector cylinder is actuated, thus raising the ejector plate and ejector pins to eject the cured shell mould from the moulding box.

The granular material treated with a bonding agent is preferably resin coated sand such as prepared from the phenol-formaldehyde resins described in U.S. Pat. No. 3,020,254 by the processes such as described in Reissue Pat. No. 25,661, both of which patents are incorporated herein by reference. Also useful are mixtures of foundry sand and powdered phenol-formaldehyde resins, frequently referred to as dry mixes, and also mentioned in the afore-mentioned patents. The term moulding box used herein is also known as a core box.

Various modifications can be made in the invention without departing from the spirit thereof. Therefore, this specification is intended to illustrate the invention but not to limit it.

What we claim is:

1. A machine for making shell molds and/or stack molds from granular material and a bonding agent, which comprises an open-topped heated molding box whose bottom is constituted by a pattern plate, and a sand dispenser having a downwardly-facing dispensing nozzle located over the molding box and at a level close to that of the top of the box, and means for traversing the dispensing nozzle horizontally across the top of the molding box to dispense sand into the box, the nozzle having an elongated horizontal edge portion which serves to level the sand in the box and to displace surplus sand; wherein the dispensing nozzle is movable horizontally to a position off-set to one side of the molding box, and when in said off-set position rests on a water-cooled closure member by which the mouth of the nozzle is closed.

2. A machine for making shell molds and/or stack molds from granular material and a bonding agent, which comprises an open-topped heated molding box whose bottom is constituted by a pattern plate, and a sand dispenser having a downwardly-facing dispensing nozzle located over the molding box and at a level close to that of the top of the box, and means for traversing the dispensing nozzle horizontally across the top of the molding box to dispense sand into the box, the nozzle having an elongated horizontal edge portion which serves to level the sand in the box and to displace surplus sand; wherein the molding box comprises a pattern frame having internal lining strips detachably secured to its inner side walls to constitute the sides of the molding space in the box, and a movable pattern plate constituting the bottom of the molding box and movable into engagement with the lower edges of the strips, whereby the depth of the molding space in the box is determined by the width of the detachable lining strips.

3. A machine as claimed in claim 2 in which the dispensing nozzle is constructed and arranged to traverse the molding box with a horizontally-reciprocating motion, and to fill the molding box with sand completely during a single forward traversing stroke across the top of the box, and its said edge portion is arranged to level the sand therein and displace surplus sand during the next succeeding return stroke of the nozzle.

4. A machine as claimed in claim 3 including a heated pressure plate movably mounted above the molding box, and means for moving the plate down onto the top of the molding box after the return stroke of the nozzle, to compact the sand in the mold box and partially cure its upper surface.

5. A machine as claimed in claim 3 in which the dispensing nozzle is rigidly secured to a sand container constituting the sand dispenser, the container being mounted for movement along a horizontal track to effect the to-and-fro movement of the dispensing nozzle over the molding box.

6. A machine as claimed in claim 4 in which the heated pressure plate is carried by the sand container for horizontal movement therewith, and is vertically movable relatively to the sand container.

7. A machine as claimed in claim 2, in which the molding box is pivotally mounted for inversion, for the purpose of tipping unbonded surplus sand from its interior.

8. A machine as claimed in claim 6 including a heated hood movable to a position enclosing the molding box to cure molded sand therein.

9. A machine as claimed in claim 1 in which the water-cooled closure member is movable horizontally and is provided with means for moving it in unison with the dispensing nozzle so long as the latter is offset from the molding box.

10. A machine as claimed in claim 2 in which the lining strips are locked into position in the pattern frame by the pattern plate when the latter is held in its operative position abutting the strips.

11. A machine as claimed in claim 10 in which the pattern frame is formed with inwardly-directed undercut flanges or grooves, and in which the lining strips are formed with correspondingly dovetailed rib or flange portions which cooperate therewith.

* * * * *